Oct. 15, 1929.  T. V. BUCKWALTER  1,731,291
RAILWAY CAR TRUCK
Filed Aug. 19, 1927  2 Sheets-Sheet 1
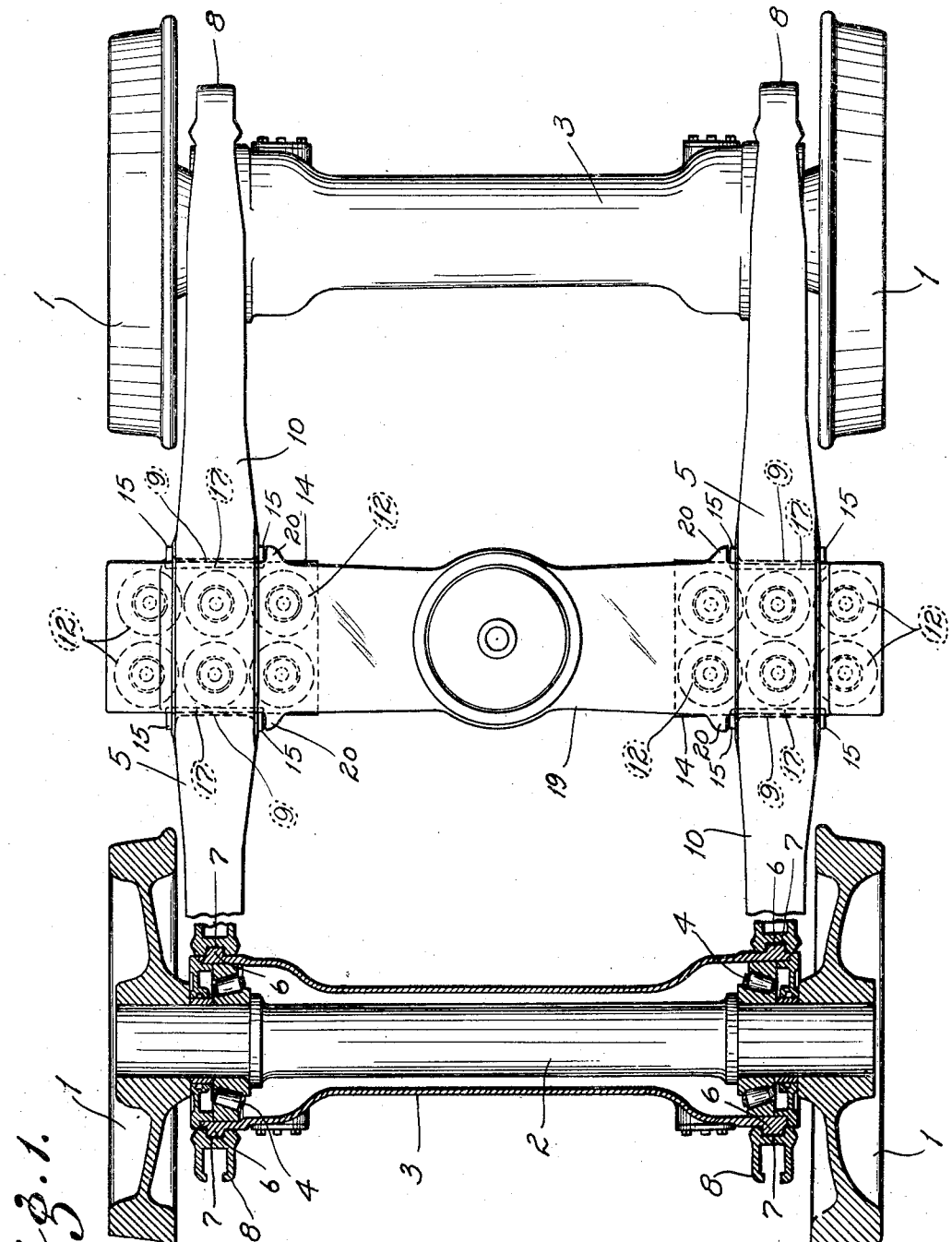

Oct. 15, 1929.  T. V. BUCKWALTER  1,731,291
RAILWAY CAR TRUCK
Filed Aug. 19, 1927    2 Sheets-Sheet 2
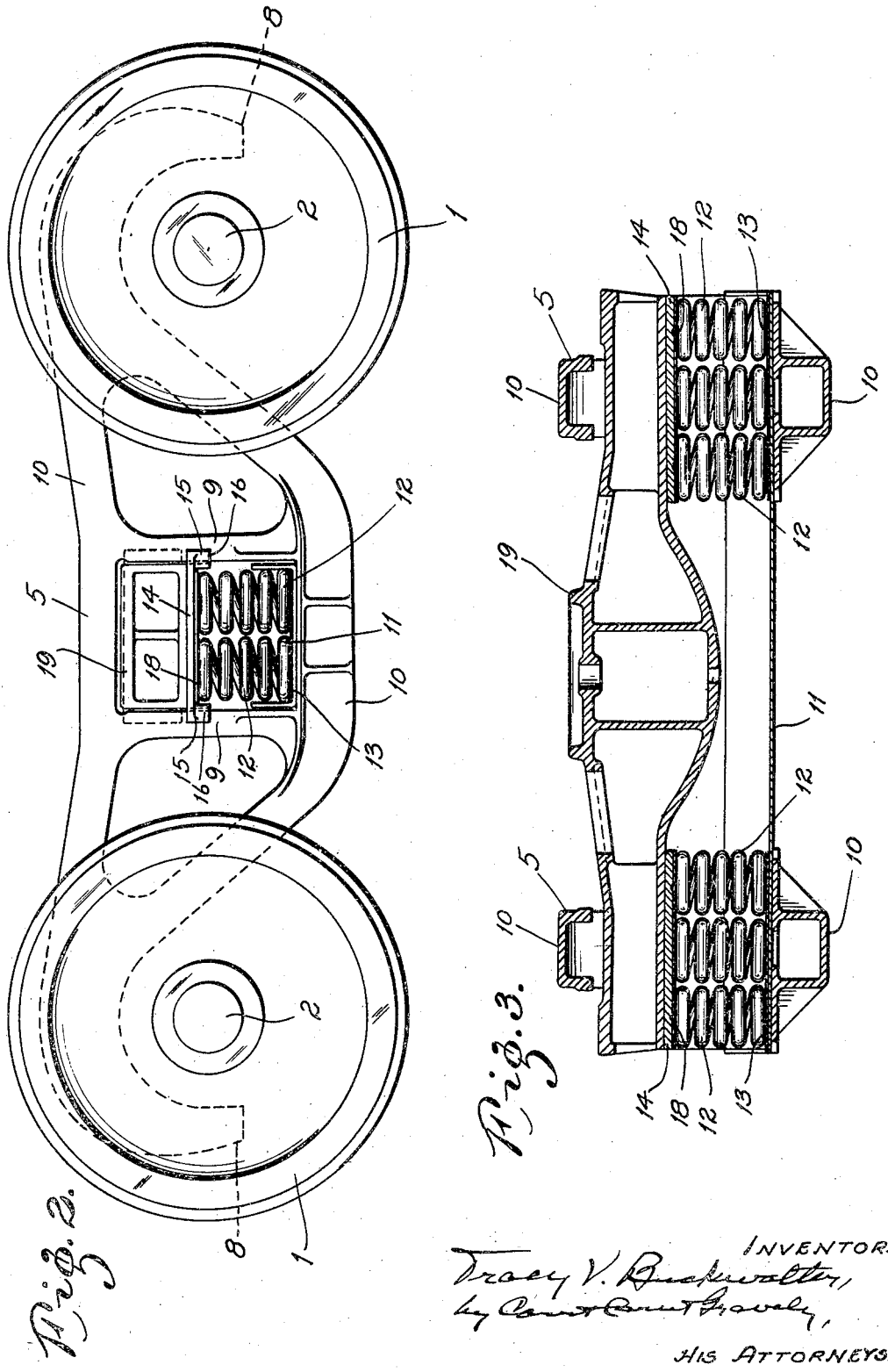
INVENTOR.
Tracy V. Buckwalter,
HIS ATTORNEYS.

Patented Oct. 15, 1929

1,731,291

UNITED STATES PATENT OFFICE

TRACY V. BUCKWALTER, OF CANTON, OHIO, ASSIGNOR TO THE TIMKEN ROLLER BEARING COMPANY, OF CANTON, OHIO, A CORPORATION OF OHIO

RAILWAY-CAR TRUCK

Application filed August 19, 1927. Serial No. 214,007

My invention relates to trucks for railway cars and the like and has for its principal object a truck that will permit relative movement as between the car truck and the car body. The invention consists principally in slidably mounting the ends of the truck bolster on plates that are supported in the truck side frames. The invention consists also in providing the bolster with stop lugs that are adapted to engage the inner faces of the truck side frames to limit the relative movement of the truck and bolster. The invention further consists in the railway car truck and in the parts and combinations and arrangements of parts hereinafter described and claimed.

In the accompanying drawing,

Fig. 1 is a top plan view of a railway car truck embodying my invention, one axle and the adjacent end portions of the truck side frames being shown in horizontal section;

Fig. 2 is a side elevation; and

Fig. 3 is a cross-sectional view through the bolster.

The drawings illustrate my invention embodied in a car truck of the inboard type. The wheels 1 are mounted on axles 2 that extend through tubular axle housings 3, roller bearings 4 being interposed between the axles and housings. Truck side frames indicated generally by the numeral 5 are secured to the ends of the housings 3, as by tongue 6 and groove 7 connections formed between the ends of the housings 3 and jaw members 8 on the ends of the truck side frames.

The truck side frames 5 are provided with vertical members or columns 9 that connect the longitudinal members or arch bars 10. Extending from side frame to side frame and secured at its ends to the lower longitudinal side frame members 10 in the space between the two columns 9 is a spring plank 11, a plurality of springs 12 being mounted on each end of the spring plank above the lower longitudinal member of each side frame. A wear plate 13 may be secured to each end of the spring plank for the springs to rest on.

Disposed above each set of springs 12 is a plate 14 that has projecting ribs 15 that engage the sides of the vertical members or columns 9, said ribs preferably having depending portions 16 and the plate having depending ribs 17 at the bottoms of the recesses outlined by said projecting ribs 15. Thus the plates 14 are permitted vertical movement in the truck side frames 5 but, by reason of the engagement of their ribs with the vertical members 9, are prevented from horizontal or transverse movement relative to the side frames. A wear plate 18 for the upper ends of the springs may be secured to the under side of each plate.

Each end of a bolster 19 on which the car body bolster (not shown in the drawing) is mounted, extends into the middle portion of a truck side frame 5 and the flat bottom portion of each end of said bolster 19 rests on one of said plates 14. On each side of said bolster near one of said columns or other suitable portion of the inner face of each truck side frame is a lug 20. Thus relative movement as between the truck side frames 5 and the bolster 19 is limited in one direction by one set of lugs 20 and in the other direction by the other set of lugs.

The thrust initially transmitted to one side frame is transmitted to the other side frame by reason of the interconnection of the two side frames through the axle housings.

The above described construction permits considerable relative movement as between the car truck and the bolster and car body, the wear cause by such movement being taken up on members that are easily replaceable, and the movement being accommodated without placing any bending stresses on the springs. The elimination of the lugs usually provided on the bolster to engage the outer faces of the vertical members of the truck side frames permits the elimination of the recesses or offsets in said vertical members that are usually required to permit assembling the truck. This results in a simpler and more sturdy construction and permits a somewhat smaller wheel base.

Obviously numerous changes may be made without departing from the invention and I do not wish to be limited to the precise construction shown.

What I claim is:

1. A railway car truck comprising axle members, truck side frames secured to said axle members, said truck side frames having vertical columns, plates held by said columns, a bolster extending into said side frames with its ends resting slidably and directly on said plates, and lugs on the sides of said bolster near said columns, said lugs limiting transverse movement of said bolster relative to said side frames.

2. A railway car truck comprising axle members, truck side frames connecting said axle members, said truck side frames having upper and lower longitudinal members connected by columns, a spring plank extending from side frame to side frame with its ends secured to said lower members of said side frames, springs mounted on the ends of said spring plank, a plate resting on each set of springs, each plate having portions engaging said columns of said side frames and a bolster extending into the space between said columns and having its end portions resting slidably and directly on said plates, said bolster having lugs near the inner faces of said side frames to limit movement of said bolster transversely of said side frames.

3. A railway car truck comprising axles, wheels thereon, housings, truck side frames connecting said axle members, said truck side frames having upper and lower longitudinal members connected by columns, a spring plank extending from side frame to side frame with its ends secured to said lower members of said side frames, springs mounted on the ends of said spring plank, a plate resting on each set of springs, each plate having portions engaging said columns of said side frames and a bolster extending into the space between said columns and having its end portions resting slidably and directly on said plates, said bolster having lugs on its sides adapted to engage the sides of said side frame columns to limit relative movement as between said bolster and the truck side frames.

Signed at Canton, Ohio, this 15th day of Aug., 1927.

TRACY V. BUCKWALTER.